US006202457B1

(12) United States Patent
Hsueh et al.

(10) Patent No.: US 6,202,457 B1
(45) Date of Patent: Mar. 20, 2001

(54) LOCK CORE ASSEMBLY FOR A CYLINDRICAL LOCK

(75) Inventors: Chiang-Lin Hsueh; Jo-Chiao Wang, both of Kaohsiung Hsien (TW)

(73) Assignee: Taiwan Fu Hsing Industrial Co., Ltd., Kaohsiung Hsien (TW)

( * ) Notice: Subject to any disclaimer, the term of this patent is extended or adjusted under 35 U.S.C. 154(b) by 0 days.

(21) Appl. No.: 09/516,224

(22) Filed: Mar. 1, 2000

(51) Int. Cl.[7] .................................................. B60P 25/02
(52) U.S. Cl. .................................................. 70/224; 70/373
(58) Field of Search .................................. 70/224, 374, 375, 70/378, 367, 370, 371, 373, DIG. 31, DIG. 39

(56) References Cited

U.S. PATENT DOCUMENTS

| | | | | |
|---|---|---|---|---|
| 949,967 | * | 2/1910 | Arens | 70/224 |
| 1,707,643 | * | 4/1929 | Segal | 70/373 |
| 2,105,659 | * | 1/1938 | Jacobi | 70/373 X |
| 2,677,953 | * | 5/1954 | Fisler et al. | 70/224 |
| 2,750,785 | * | 6/1956 | Golden | 70/224 |
| 2,755,656 | * | 7/1956 | Schwartz | 70/375 X |
| 2,877,638 | * | 3/1959 | Muttart | 70/373 X |
| 3,175,377 | * | 3/1965 | Russell et al. | 70/224 |
| 3,176,488 | * | 4/1965 | Jacobi | 70/373 |
| 3,209,568 | * | 10/1965 | Patriquin | 70/373 |
| 3,303,678 | * | 2/1967 | Bernard et al. | 70/373 |
| 3,324,694 | * | 6/1967 | Tornoe | 70/375 |
| 3,492,842 | * | 2/1970 | Schlage | 70/375 X |
| 3,793,857 | * | 2/1974 | Schlage | 70/224 X |
| 4,098,103 | * | 7/1978 | Raskevicius | 70/373 X |
| 4,966,399 | | 10/1990 | Lin | 292/359 |
| 5,161,397 | * | 11/1992 | Raybary | 70/375 X |
| 5,431,034 | * | 7/1995 | Fann et al. | 70/375 X |
| 5,564,296 | * | 10/1996 | Theriault et al. | 70/224 |
| 5,605,064 | * | 2/1997 | Katayama et al. | 70/224 |
| 5,884,512 | * | 3/1999 | Wayne | 70/373 X |

* cited by examiner

*Primary Examiner*—Suzanne Dino Barrett
(74) *Attorney, Agent, or Firm*—Bacon & Thomas, PLLC

(57) ABSTRACT

A lock core assembly is provided for a cylindrical lock. The cylindrical lock includes a knob having a lock core opening defined in an end face thereof and a spindle projected outward from the other end face thereof. A slot extends along the spindle and includes an extension extended into the other end face, thereby defining two stop wall portions on two opposite sides of the extension of the slot. The lock core assembly includes a barrel and a lock core rotatably mounted in the barrel. The barrel includes a protruded top portion with two lateral wings bearing against the stop wall portions of the extension of the slot.

5 Claims, 3 Drawing Sheets

LOCK CORE ASSEMBLY FOR A CYLINDRICAL LOCK

BACKGROUND OF THE INVENTION

1. Field of the Invention

The present invention relates to a lock core assembly for a cylindrical lock, and more particularly to a lock core assembly that can be easily assembled to a knob of a cylindrical lock.

2. Description of the Related Art

U.S. Pat. No. 4,966,399 issued on Oct. 30, 1990 and entitled "LOCK SET WITH SPINDLE LOCK", as illustrated in FIG. 1 of the drawings as a prior art, discloses a cylindrical lock comprising a knob 90 with a spindle 91 and a lock core opening 92. A lock core assembly 93 is mounted in the knob 90 and has an end 94 fitted in the lock core opening 92. The lock core assembly 93 further has a protruded top portion 95 fitted in a slot 96 of the knob 90. Since two ends of the lock core assembly 93 are respectively fitted in the lock core opening 92 and an end face 97 of the knob 90 and have straight lengths, the lock core assembly 93 falls into the knob 90 sometimes during assembly. More specifically, the lock core assembly 93 is completely inside the knob 90 in an undesired manner. Retrieval of the lock core assembly 93 is not only difficult but also time-consuming and sometimes may cause deformation of the knob 90, resulting in a failed product.

SUMMARY OF THE INVENTION

It is a primary object of the present invention to provide a lock core assembly for a cylindrical lock for preventing unintentional falling of the lock core assembly into the knob. The subsequent retrieval problem is avoided accordingly.

A lock core assembly in accordance with the present invention includes a protruded top portion with lateral wings that are wider than a width of a slot in an end face of the knob, thereby preventing falling of the lock core assembly into the knob.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

Preferred embodiments in accordance with the present invention will now be described with reference to the accompanying drawings.

Figure 1:
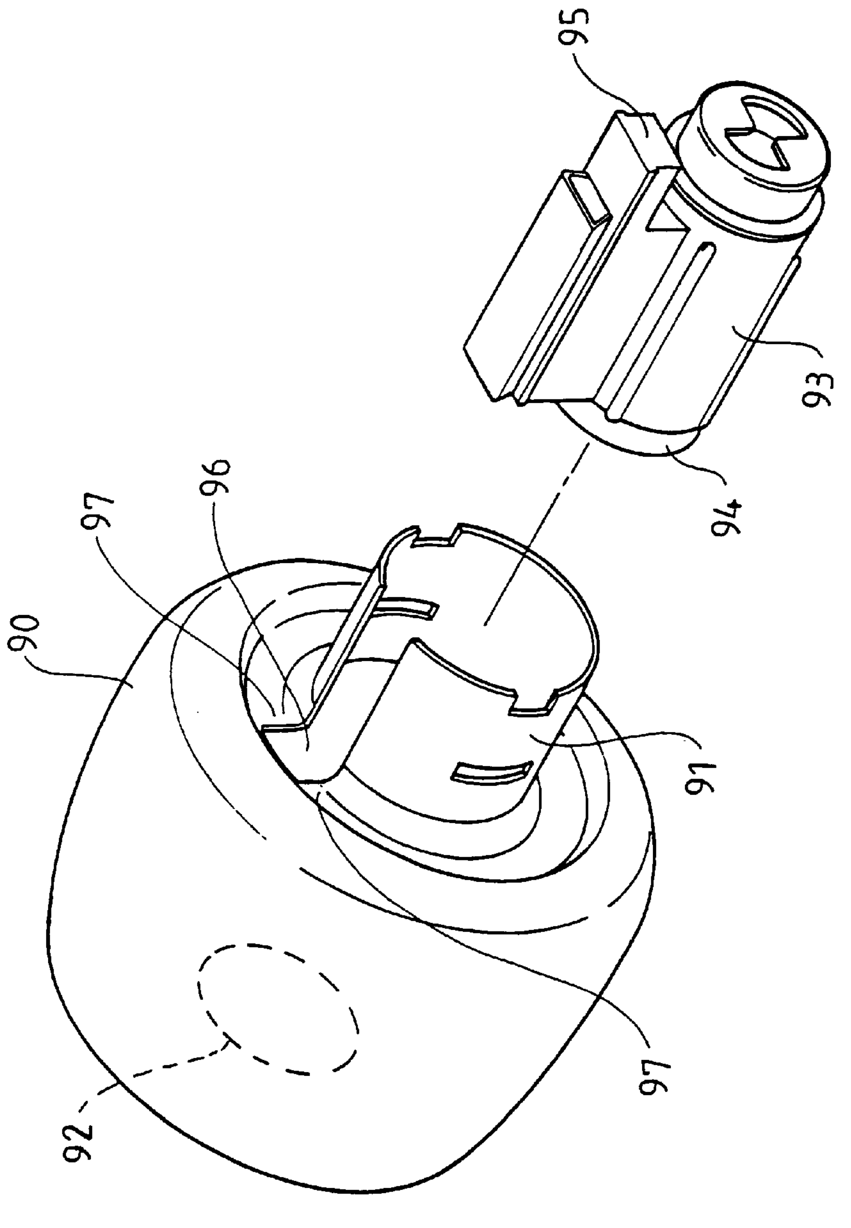
FIG.1 PRIOR ART
FIG. 1 is an exploded perspective view of a conventional cylindrical lock.
Figure 2:
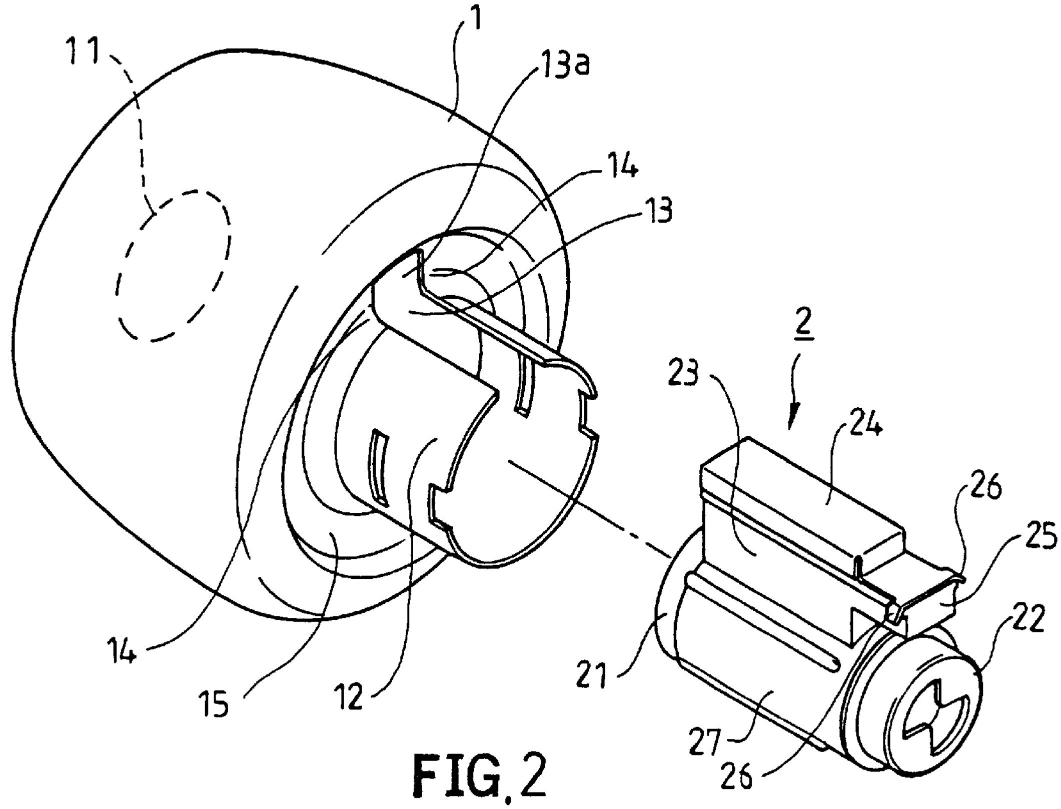
FIG. 2 is an exploded perspective view of a cylindrical lock with a first embodiment of a lock core assembly in accordance with the present invention.

Referring to FIG. 2, a cylindrical lock in accordance with the present invention generally includes a knob 1 and a lock core assembly 2. The knob 1 may be a conventional cylindrical knob. An end face of the knob 1 includes a lock core opening 11 for positioning an end of the lock core assembly 2. A spindle 12 extends longitudinally from the other end face 15 of the knob 1 and includes a slot 13 that extends along a longitudinal direction of the spindle 12 and has an extension 13*a* extended into the other end face 15 of the knob 1, thereby forming two stop wall portions 14 on opposite sides of the extension 13*a* of the slot 13 in the other end face 15.

The lock core assembly 2 includes a barrel 27 and a rotatable lock core 21 having two ends respectively protruded beyond two end faces of the barrel 27. A keyway (not labeled) is defined in an end of the lock core 21 to allow insertion of a proper key such that the lock core 21 can be rotated. The end of the lock core 21 is rotatable in the lock core opening 11. An actuating member 22 is mounted to the other end of the lock core 21 for engaging with an actuating plate (not shown) that extends through a latch bolt (not shown), which is conventional and therefore not described in detail.

Figure 5:
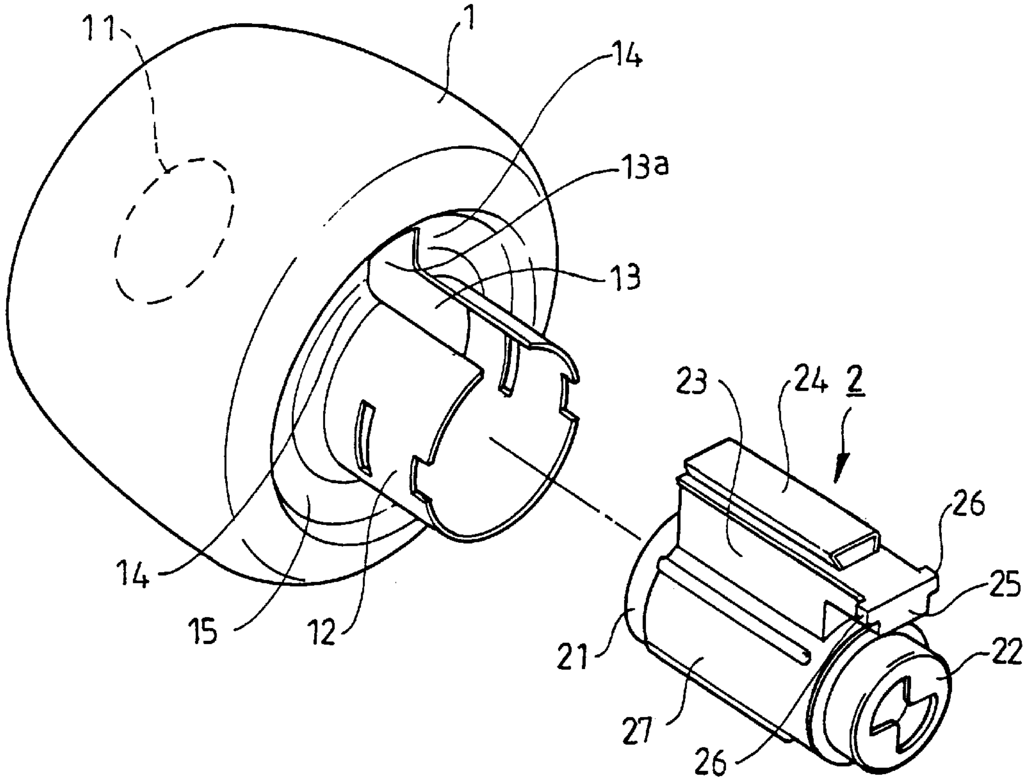
FIG. 5 an exploded perspective view of a cylindrical lock with a second embodiment of the lock core assembly in accordance with the present invention.

The barrel 27 of the lock core assembly 2 includes a protruded top portion 23 for receiving pin tumblers (not shown) of the lock core 21 and a cover 24 for enclosing the pin tumblers to prevent disengagement of the pin tumblers. Most part of the protruded top portion 23 is inside the knob 1 except for a portion 25 that is beyond the end face 15. The portion 25 and the actuating member 22 are located on the same side of the barrel 27. In addition, two lateral wings 26 are formed on opposite lateral sides of the cover 24 (e.g., by means of bending the cover 24) best shown in FIGS. 2 and 3. In an alternative embodiment of the invention, the lateral wings 26 are formed on opposite lateral sides of the portion 25, best shown in FIG. 5.

Figure 3:
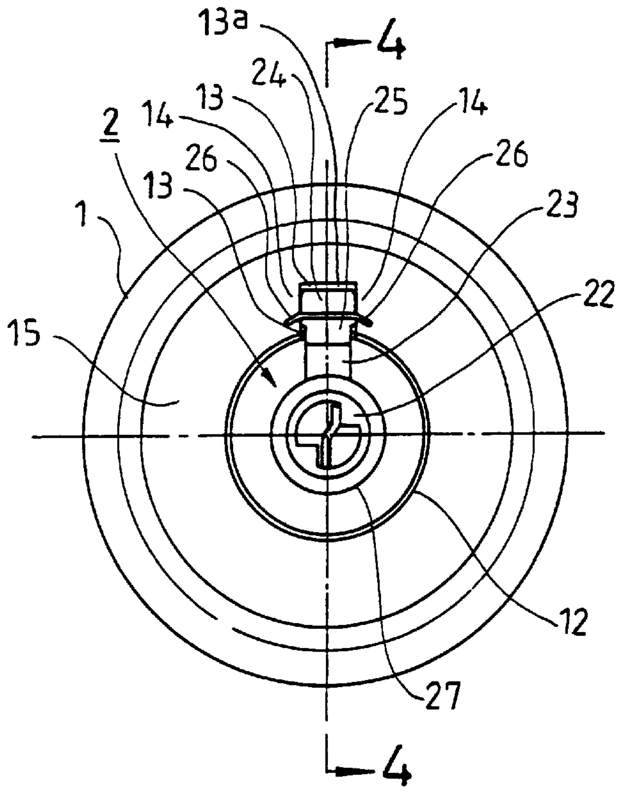
FIG. 3 is an end view of the cylindrical lock in FIG. 2.
Figure 4:
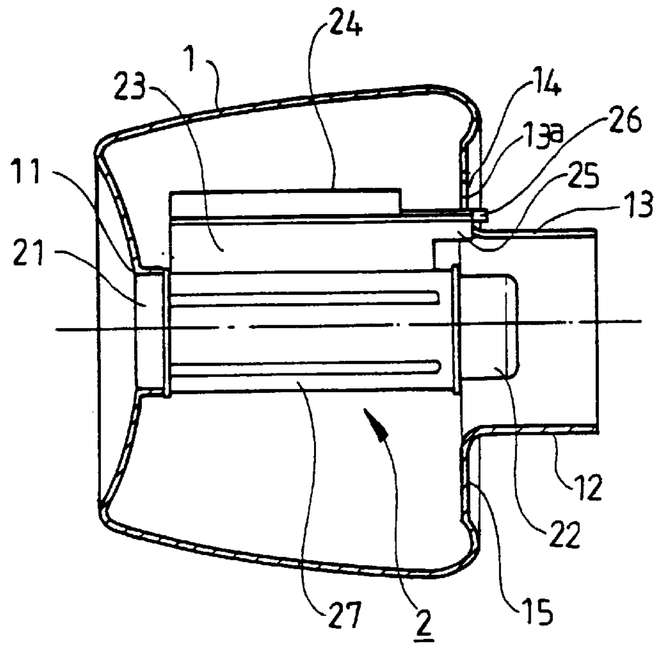
FIG. 4 is a sectional view taken along line 4—4 in FIG. 3.

Referring to FIGS. 3 and 4, after inserting the lock core assembly 2 into the knob 1, the end of the lock core 21 is in the lock core opening 11 and the lateral wings 26 bear against the stop wall portions 14 of the end face 15, thereby preventing the lock core assembly 2 from falling into the knob 1.

Thus, falling of the lock core assembly 2 into the knob 1 is prevented. The subsequent problem of retrieval of the lock core assembly 2 no longer exists. Easier manufacture and assembly of the lock core assembly are provided.

Although the invention has been explained in relation to its preferred embodiment as mentioned above, it is to be understood that many other possible modifications and variations can be made without departing from the spirit and scope of the invention. It is, therefore, contemplated that the appended claims will cover such modifications and variations that fall within the true scope of the invention.

What is claimed is:

1. A lock core assembly comprising, in combination:

a knob including a first end face with a lock core opening and a second end face with a spindle projected from the second end face, a slot being defined in the spindle and having an extension extended into the second end face, thereby defining two stop wall portions on two opposite sides of the extension of the slot, the two stop wall portions positioned on the second end face of the knob; and a lock core assembly including a barrel with two ends and a lock core rotatably mounted in the barrel, the lock core including two ends extended beyond the ends of the barrel, respectively, one of the ends of the lock core being located in the lock core opening, the other end of the lock core including an actuating member mounted thereto, the barrel including a protruded top portion with at least one lateral wing bearing against the stop wall portions of the knob.

2. The lock core assembly as claimed in claim 1, wherein the protruded top portion includes two said lateral wings that are located on two lateral sides thereof.

3. The lock core assembly as claimed in claim 1, wherein the protruded top portion is enclosed by a cover, and wherein said at least one lateral wing is a lateral extension of the cover.

4. A lock core assembly including a barrel with two ends and a lock core rotatably mounted in the barrel, the lock core including two ends extended beyond the ends of the barrel, respectively, one of the ends of the lock core allowing insertion of a key, the other end of the lock core including an actuating member mounted thereto, the barrel including a protruded top portion with at least one lateral wing, said at least one lateral wing and said actuating member being located on the same side of the barrel.

5. The lock core assembly as claimed in claim 4, wherein the protruded top portion of the barrel is provided for receiving a plurality of pin tumblers and a cover is provided for enclosing the pin tumblers, and wherein said at least one lateral wing is a lateral extension of the cover.

* * * * *